(12) United States Patent
Reiniger et al.

(10) Patent No.: US 10,427,432 B2
(45) Date of Patent: Oct. 1, 2019

(54) MEASURING DEVICE, MEASURING SYSTEM, AND METHOD FOR CALIBRATING PRINTING STATIONS

(71) Applicant: KHS GmbH, Dortmund (DE)

(72) Inventors: Markus Reiniger, Möchengladbach (DE); Sascha Koers, Bergkamen (DE); Katrin Preckel, Gelsenkirchen (DE); Daniel Teufert, Dortmund (DE); Werner Van De Wynckel, Humbeek (BE)

(73) Assignee: KHS GmbH, Dortmund (DE)

( * ) Notice: Subject to any disclaimer, the term of this patent is extended or adjusted under 35 U.S.C. 154(b) by 265 days.

(21) Appl. No.: 15/542,166

(22) PCT Filed: Dec. 22, 2015

(86) PCT No.: PCT/EP2015/080981
§ 371 (c)(1),
(2) Date: Jul. 7, 2017

(87) PCT Pub. No.: WO2016/113088
PCT Pub. Date: Jul. 21, 2016

(65) Prior Publication Data
US 2018/0333965 A1    Nov. 22, 2018

(30) Foreign Application Priority Data

Jan. 12, 2015   (DE) .................. 10 2015 100 338

(51) Int. Cl.
*B41J 25/304*     (2006.01)
*B41M 1/40*       (2006.01)
(Continued)

(52) U.S. Cl.
CPC .............. *B41J 25/304* (2013.01); *B41M 1/40* (2013.01); *B41J 3/4073* (2013.01); *G01B 11/24* (2013.01)

(58) Field of Classification Search
CPC ................................ B41M 1/40; B41J 3/4073
See application file for complete search history.

(56) References Cited

U.S. PATENT DOCUMENTS

| | | | | |
|---|---|---|---|---|
| 5,317,967 A | * | 6/1994 | Heidenreich | ....... B41F 15/0886 101/127.1 |
| 8,994,959 B2 | * | 3/2015 | Beckhaus | ............... B41F 17/18 356/138 |

(Continued)

FOREIGN PATENT DOCUMENTS

| | | |
|---|---|---|
| DE | 10 2005 003333 | 7/2006 |
| DE | 10 2007 050490 | 4/2009 |

(Continued)

*Primary Examiner* — Julian D Huffman
(74) *Attorney, Agent, or Firm* — Occhiuti & Rohlicek LLP (57) ABSTRACT

A measuring device includes a receiving device that detects measurement information indicative of a position and/or orientation of a position-modifiable component of a printing station having a print head whose position and/or orientation is adjustable by a motor and that transfers measurement information via a link. A receiving holder then introduces this receiving device into a structure that holds it at a defined position relative to the position-modifiable component. Suitable structures in which the receiving device can be introduced include a container-holding device and a receiving element for a container-holding device.

20 Claims, 4 Drawing Sheets

(51) Int. Cl.
*B41J 3/407* (2006.01)
*G01B 11/24* (2006.01)

(56) References Cited

U.S. PATENT DOCUMENTS

| | | | |
|---|---|---|---|
| 10,279,600 B2 * | 5/2019 | Gertlowski | G01N 21/909 |
| 2003/0132987 A1 | 7/2003 | Ogawa | |
| 2004/0263544 A1 | 12/2004 | Kojima | |
| 2006/0073268 A1 | 4/2006 | Bae et al. | |
| 2006/0092199 A1 | 5/2006 | White et al. | |
| 2009/0145511 A1 | 6/2009 | Till | |
| 2012/0011807 A1 * | 1/2012 | Preckel | B41J 3/4073 |
| | | | 53/167 |

FOREIGN PATENT DOCUMENTS

| | | |
|---|---|---|
| DE | 10 2009 041 527 | 2/2011 |
| DE | 10 2012 005 046 | 9/2013 |
| EP | 2 799 150 | 11/2014 |
| WO | WO2004/085738 | 10/2004 |

* cited by examiner

MEASURING DEVICE, MEASURING SYSTEM, AND METHOD FOR CALIBRATING PRINTING STATIONS

RELATED APPLICATIONS

This is the national stage of PCT/EP2015/080981, filed on Dec. 22, 2015, which claims the benefit of the Jan. 12, 2015 priority date of German application DE 102015100338.4, the contents of which are herein incorporated by reference.

FIELD OF INVENTION

The invention relates to container processing, and in particular, to printing on containers.

BACKGROUND

It is known to print on containers using inkjet printers. However, when doing so, it is important that the position of the printer relative to the container be known precisely. If errors are made, they will appear as distortions in the image. To avoid such errors, it is known to calibrate the printer heads.

A difficulty associated with conventional calibration methods is that alignment errors caused by differing degrees of freedom of the print head are superimposed on one another. This makes it difficult to observe a printing error and derive from it a particular alignment correction to correct that error.

SUMMARY

An object of the invention is that of providing a measuring device that makes possible the rapid and precise calibration of printing heads on printing stations.

In one aspect, the invention relates to a measuring device for making measurements of a printing station comprising a print head. The print head has an adjustable position. This enables it to print on different containers, container formats, or container regions respectively.

As used herein, "adjustable" includes the ability to cause translation or rotation.

The measuring device includes a receiving device that is configured for obtaining measurement information relating to a position-modifiable component of the printing station. In some embodiments, the receiving device is an optical receiving device.

The measuring device further comprises an interface for transferring the measurement information thus obtained. Examples of a suitable interface include wired interfaces, such as those that rely on USB and Firewire, and wireless interfaces, such as those that rely on a WLAN or Bluetooth.

The measuring device further comprises a receiving holder, that is designed for introducing into a container-holding device provided on the printing station, such as a container-holding device that is an integral component part of the printing station, or for introducing into a receiving element provided on the printing station for a container-holding device, such as a container-holding device that is detachably connected to the printing station by way of the receiving element, in order to hold the receiving holder in a defined position relative to the position-modifiable component. A useful feature of the invention is that the measuring device can be driven in the receiving holder by a motor means in much the same way it would be if it were a container. It can therefore be rotated and translated just as if it were a container.

The receiving holder is positioned relative to the print head or print-head carrier in a manner comparable to that of a container or a container-holding device. This means that manufacturing tolerances in the container-holding device or the receiving element for the container-holding device cannot help but be taken into account in the detecting of the measurement information. This is because the receiver is held just as if it were a container.

In some embodiments, the receiving holder is detachably secured on the container-holding device. Among these embodiments are those in which a receiving holder places the measuring device under tension in a manner comparable to how it would otherwise place a container under tension. In alternative embodiments, the receiving holder is configured to be comparable in form to a container-holding device such that the receiving holder can be introduced into a corresponding receiving element or holder.

In such embodiments, the receiving holder comprises securing sections or one or more reference surfaces that are complementary to counter-surfaces provided on the container-holding device or the receiving element. As a result, it becomes possibly to exactly hold the measuring device in the same way that a container to be printed upon would be held or in the same way that a container-holding device would be held.

In some embodiments, the receiving holder is configured for holding the container-holding device under tension between an upper and a lower fixing device. In such embodiments, the container-holding device is a constituent of the printing station. This means that the measuring device can be precisely fixed and centered on the printing station.

In some embodiments, the receiving holder includes at least one upper and one lower free end. The upper free end matches a holding and centering tulip of the container-holding device and the lower free end matches a placement surface of the container-holding device. This results in the measuring device being clamped exactly between a holding-and-centering tulip and the placement surface.

In some embodiments, the receiving holder suspends the receiving device. Among these are embodiments in which the receiving holder is introduced into a receiving element provided above the print head. In such embodiments, the receiving device at a distance from the underside of the receiving holder In some embodiments, the receiving holder comprises a reference surface that interacts with a complementary counter-surface on the printing station. Preferably the counter-surface formed is one formed at the receiving element for the container-holding device. This results in shape-adapted receipt of the receiving holder on the printing station. This counter-surface preferably likewise forms a contact surface for the container-holding device by means of which a container that is to be printed upon is fixed while it is being printed. Accordingly, during the calibrating of the print head based on the measurement information detected by the receiving device, manufacturing tolerances in the region of the receiving element can be taken into account.

Ideally, at least one radial and one axial reference surface are provided. The radial reference surface determines the distance interval between in particular the print head and the receiving device. The axial reference surface determines the vertical position of the receiving holder or of the receiving device respectively in each case in interaction with the corresponding counter-surfaces of the printing station or of the printing module.

The axial reference surface can be formed as a shoulder or a lying contact edge. The radial reference surface can be formed as a concave circular cut-out as a counter-contour to the convex surface contour of the receiving holder.

In the case of spherical, conical, or frustoconical centering elements, the reference surfaces are arranged on the centering elements or coincide on the centering elements to form one single reference surface, which is spherically shaped.

According to one exemplary embodiment, the receiving device is a camera, preferably a 3D camera or a laser scanner, preferably a 3D laser scanner. By these measuring devices, measurement information relating to the surfaces of the position-modifiable component in the printing station is determined, which contains information about the locational position, in particular the three-dimensional position, of the position-modifiable component. Based on this measurement information, position correction values can be determined, as calibration information.

According to one exemplary embodiment, the receiving device is configured to receive a set of measurement information, which is determined during the movement of the position-modifiable component. It is therefore possible to receive measurement information that includes information about the movement path of the position-modifiable component. As a result, a more exact calibration of the printing station can be carried out.

According to some embodiments, the position-modifiable component is the print-head carrier or a region of the print head. The print-head carrier can be displaced in different spatial directions. Or it can be print-head holder that can be pivoted about at least one pivot axis. By receiving of measurement information at the print-head carrier or at the print head itself, the measurement information necessary for the determination of calibrating information can be obtained.

According to one exemplary embodiment, the position-modifiable component is at least one print head nozzle or a reference surface of the print head. The print head nozzle represents the issue point of the printing color or printing ink. It therefore forms an ideal measuring point to be detected by the measuring device. Depending on the type of print head used, a surface area can be also act as the position-modifiable component. A suitable such surface area is one on the housing of the print head or in the region of the print head nozzles. The use of these measuring points in connection with receiving measurement information promotes optimal calibration of the print head.

According to one exemplary embodiment, the measuring device is a part of a measuring system that includes a computer. The computer receives the measurement information via a link and determines calibration information based on the measurement information. Based on the measurement information determined, the computer derives certain manipulated variables. These represent extents to which the print head must be adjusted and the directions of those adjustments to optimize container printing. For this purpose, one or more encoders can be provided at the mechanical elements moving the print head, by means of which either an absolute position (absolute encoder) or a relative position (relative to a reference point, such as a reference mark or an end position) can be determined. Accordingly, the print head can be moved exactly into a desired reference position. Other positioning methods known from the prior art are also possible.

According to a further aspect, the invention relates to a measuring system. The measuring system comprises a measuring device, a computer, and an interface, in particular a transmission interface. The measuring device is configured in accordance with one of the foregoing exemplary embodiments. The computer is configured to receive the measurement information provided by the receiving device and to determine calibration information based on the measurement information. The information is provided for the transfer of calibration information to a unit that receives the calibration information.

An advantage of the measuring system is that the print head can be calibrated quickly and exactly while taking account of error tolerances at the container receiver or at the receiving element for a container-holding device, to a defined desired reference position. Another advantage is that it is not necessary to infer calibration information from inspecting a printed image.

According to one exemplary embodiment, the transfer interface couples to local storage at the printing station for transferring the calibration information to the local storage. In such cases, when the printing station is configured as an exchangeable printing module, the measurement of the printing module can take place after its first manufacture or after an inspection at the manufacturers' premises. The calibrating information can then be stored in the local storage. After the installation of the printing module into a printing device, it is possible to calibrate the printing module based on the locally-stored calibration information. It is further possible for the printing station or the printing module to be recalibrated from time to time based on this locally stored calibration information.

In other embodiments, the transfer interface transfers the calibration information to common storage that connects to a plurality of printing stations. Accordingly, the calibration information for all the printing stations of a printing device can be stored centrally with the calibration information for each printing station being identified by a suitable address. The central storage in some cases is on an on-line server. As such, the calibration information can be centrally stored on the cloud.

For purposes of calibration, the calibration information can then be read out and the printing stations can be calibrated in accordance with the calibration information allocated to them.

With a particularly advantageous embodiment, the receiving holder comprises a port or receiving capacity and data interface for an exchangeable portable storage medium, such as, for example, a USB stick (USB flash drive), micro SD card, a USB backup dongle, or the like. The measuring and calibration data is then stored on these exchangeable storage media, which, if appropriate, can also be stored separately from the printing modules or stations, backed up, and/or transmitted.

Accordingly, a printing module cannot be taken into operation in an unauthorized manner without the portable storage medium relating to it or the corresponding receiving holder. As well as the measuring and calibration data, other suitable data can advantageously be stored on the portable storage medium, in particular for the printing module and/or the printing station.

With one variant of this, the measuring and calibration data is stored for a number of printing modules and/or stations on only one of the portable storage media, wherein only one receiving unit or the printing device itself has a receiving capacity and interface for this storage medium.

The data transfer from the measuring system onto the portable memory takes place in a known manner directly at the measuring system or receiving holder, or downstream of these by a central control and computer unit.

The measured values can of course be stored and provided alone or also additionally in the control unit or memory storage unit of the printing device, the printing stations, or on a central server, in this case, in particular, in a cloud available online. A memory storage space available online offers the advantages in particular that easy availability of the data is provided, which is advantageous not only for the installation of modules but also for batch tracking and quality management.

According to one exemplary embodiment, the interface is configured for the direct transfer of calibration information to an actuator of the printing station or a control unit connected to this actuator. As a result, the print head can be calibrated with the direct use of calibration information provided by the measuring system.

According to one exemplary embodiment, the measuring system is configured for the provision of calibration information for the calibration of the print head to an absolute desired reference position or to a relative desired reference position, which provides a relative positioning of a print head relative to a region of the container-holding device or a region of the receiving element for a container-holding device. Accordingly, all the printing stations of a rotor or all the printing stations of a plurality of rotors (for example with a multicolor print distributed over several rotors) can be calibrated at least relative to one another in such a way that the arrangement of a plurality of part printing images (which are produced by printing stations at different rotors) can be carried out as exactly as possible, such that an optically perfect and sharp total printing image is produced from the superimposed part printing images.

For situations in which a printing station contains a plurality of print heads, the measuring device or the measuring system can be used for the calibration of these print heads relative to one another.

Finally, the invention relates to a method for the calibration of at least one printing station comprising a print head. Such a method includes providing a measuring device, wherein the measuring device is configured for the acquisition of measurement information relating to a position-modifiable component of the printing station; introducing the measuring device into a container-holding device provided at the printing station, or the bringing of the measuring device to a receiving element, provided at the printing station, for a container-holding device; acquiring measurement information relating to the position-modifiable component by a receiving device provided at the measuring device; and calibrating the print head based on the measurement information acquired.

As used herein, "container" refers to all containers, in particular bottles, cans, etc.

As used herein, the terms "essentially" or "approximately" signify deviations from an exact value in each case by ±10%, preferably by ±5%, and/or deviations that are not of significance for function.

Further embodiments, advantages, and possible applications of the invention also derive from the following description of exemplary embodiments and from the figures. In this situation, all the features described and/or represented as images are, taken alone or in any desired combination, in principle the object of the invention, regardless of their combination in the claims or reference to them. The contents of the claims are also deemed a constituent part of the description.

BRIEF DESCRIPTION OF THE DRAWINGS

These and other features and advantages of the invention will be apparent from the following detailed description and the accompanying figures, in which.

DETAILED DESCRIPTION

Figure 1:
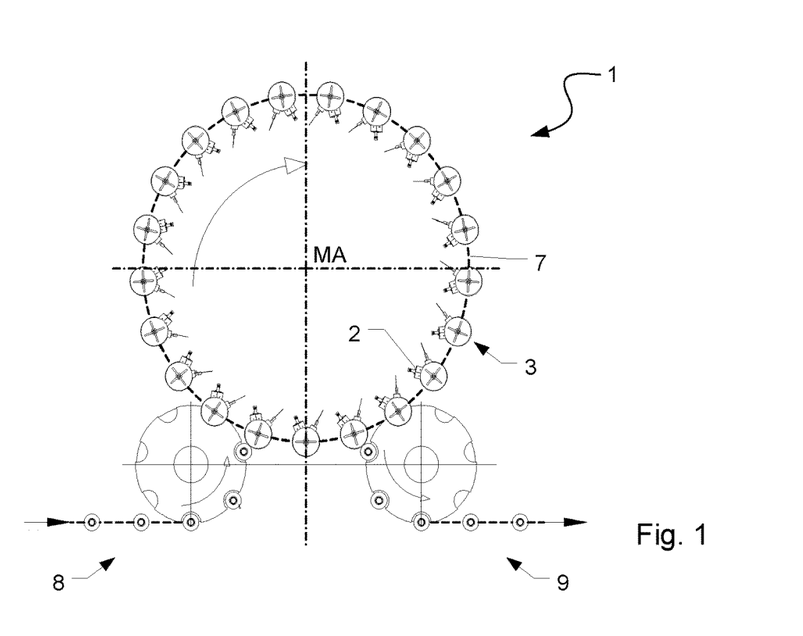
FIG. 1 shows a printing device in a schematic representation from above.

FIG. 1 shows a rotating printing-device 1 for printing bottles or similar containers. The printing device 1 includes printing stations 3, each of which has a digitally-actuated inkjet print-head 2.

Figure 2:
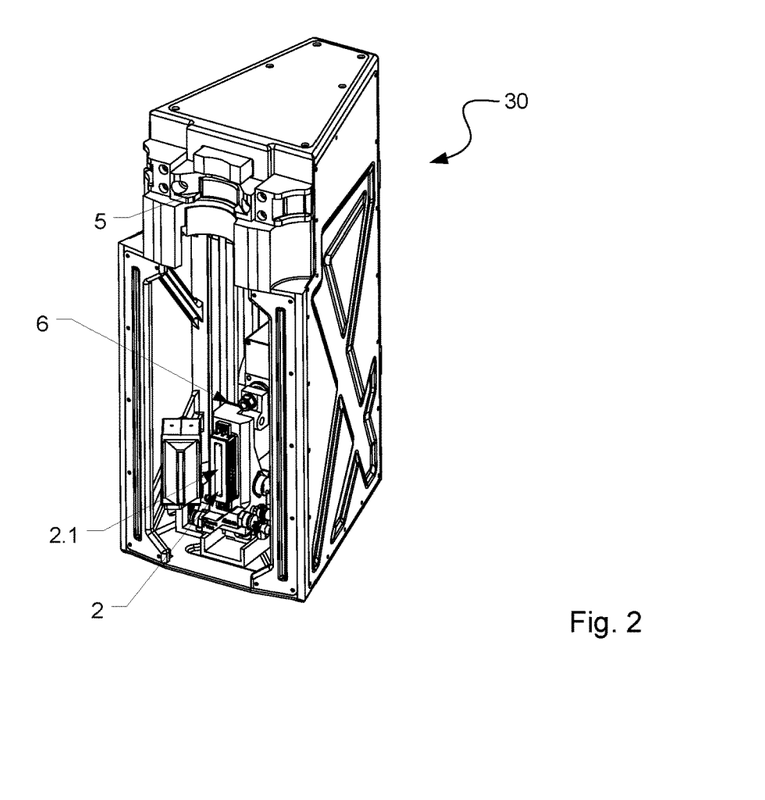
FIG. 2 shows a perspective view of a printing module for the printing device shown in FIG. 1.

Referring to FIG. 2, each print head 2 has nozzles 2.1 that can be electrically actuated on an individual basis. Suitable elements for actuating a nozzle include an electrode or a piezoelectric element. In a typical arrangement, the nozzles 2.1 lie along a vertical line.

Referring back to FIG. 1, the printing device 1 includes a rotor 7 that is driven to rotate about a vertical machine-axis MA, either intermittently or continuously. The printing stations 3 occupy the rotor's circumference. Each printing station 3 has one or more print heads 2 that move with the printing station 3.

A container inlet 8 receives containers to be printed upon and conveys them on to corresponding printing stations 3 on the rotor 7. Printing takes place as the container moves with the rotor 7. A container outlet 9 then removes containers, which have just been printed upon, from the rotor 7.

Printing takes place line-by-line as the container moves relative to the print head 2. In the illustrated embodiment, each container rotates about its container axis as it is being printed upon.

The printing stations 3 can be formed by individual function elements that are distributed around the rotor's circumference. In a typical embodiment, each printing station 3 has one print head 2 and one container carrier for receiving a container. A printing station 3 can also have other function elements, such as a curing station for hardening ink.

In other embodiments, the printing station is formed as a printing module 30 as shown in FIG. 2. A printing module 30 can be swapped in and out of the rotor 7 as a unit. Each printing module 30 comprises a housing, or at least a carrying structure. The printing module 30 includes all function elements necessary for printing and drying. These include at least one print head 2 and at least one container-holding device, as well as means for holding and releasing the container-holding device. The container-holding device precisely positions the container relative to the print head 2. The printing module 30 also includes a receiving element 5 for a container-holding device. In alternative embodiments, the container-holding device is a constituent part of the printing module 30.

To achieve high-precision printing of the container, it is necessary to calibrate the print head 2 so that it adopts a desired position during printing. This desired position will be referred to herein as the "reference position." In particular, it is necessary for the print head 2 to adopt a defined reference position relative to the container-holding device. This is vital because the container-holding device is what holds and centers the container that is to be printed upon and that also rotates it about its container vertical axis during the printing process.

In addition to its print head 3, the printing station 3 includes a container-holding device 4 for holding and centering a container while it is being printed upon. In the embodiment shown, the container-holding device 4 holds and fixes a container on its upper side and on its underside. To achieve this, the container-holding device 4 includes an upper fixing-device 4.1 and a lower fixing-device 4.2. In a typical implementation, the upper fixing-device 4.1 is a centering tulip and the lower fixing-device 4.2 is a container carrier or container plate. By moving the upper and lower fixing devices 4.1, 4.2 relative to one another, it becomes possible to hold a container in tension between the upper and lower fixing-devices 4.1, 4.2.

Figure 3:
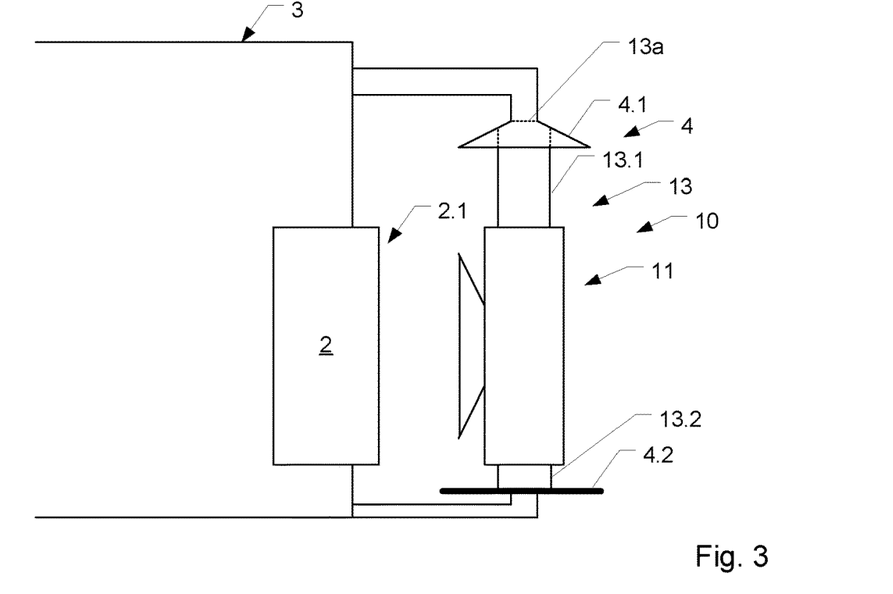
FIG. 3 shows a measuring arrangement held in a container-holding device of a printing station, according to a first embodiment.

FIG. 3 shows a first embodiment of a measuring device 10 arranged at a printing station 3. The measuring device 10 includes a receiving device 11 that receives measurement information from a position-modifiable component of the printing station 3. The receiving device 11 receives information optically. This optically-received information indicates position and velocity in three-dimensions. In some implementations, the receiving device 11 is a camera. In others, it is a scanner. Among the latter are embodiments in which the scanner is a laser scanner.

The measuring device 10 further includes a receiving holder 13 that fixes the receiving device 11 to the container-holding device 4. The receiving holder 13 has an upper section 13.1 and a lower section 13.1. The upper section 13.1 matches the upper fixing device 4.1. For example, when the upper fixing device 4.1 is a centering tulip, the upper section 13.1 matches the tulip's shape. The lower section 13.2, matches the lower fixing device 4.2. As a result, it is possible to place the measuring device 10 under tension in the container-holding device 4 in a manner analogous to a container that is to be printed upon and in such a way that the receiving device 11 is located opposite the print head 2 or its print-head carrier 6 respectively, such that regions of the print head 2 or the print-head carrier 6 can be received by the receiving device 11.

FIG. 3 shows a further embodiment of a measuring device 10 for a printing station 3 that is configured for receiving and holding a container-holding device 4 to which a container is allocated. The printing station 3 includes a receiving element 5 to which a container-holding device 4 can be secured and then detached by, for example, turning an electromagnet on and off. In some embodiments, the container-holding device 4 is configured in a manner comparable to the container-holding device disclosed in German patent application DE 10 2009 041 527 A1, the contents of which are herein incorporated by reference.

The container-holding device 4 includes a carrier or a housing that can be detachably fixed to a receiving element 5 provided at the printing station 3. A container can be held or fixed by this container-holding device 4, for example by a holding arrangement that has been placed under tension on the upper side and underside or by a suspending arrangement at the container's mouth. In some embodiments, the container-holding device 4 is transferred from a printing station to another downstream printing station following in the containers' transport direction. This is particularly useful for printing images with more than one color.

Figure 4:
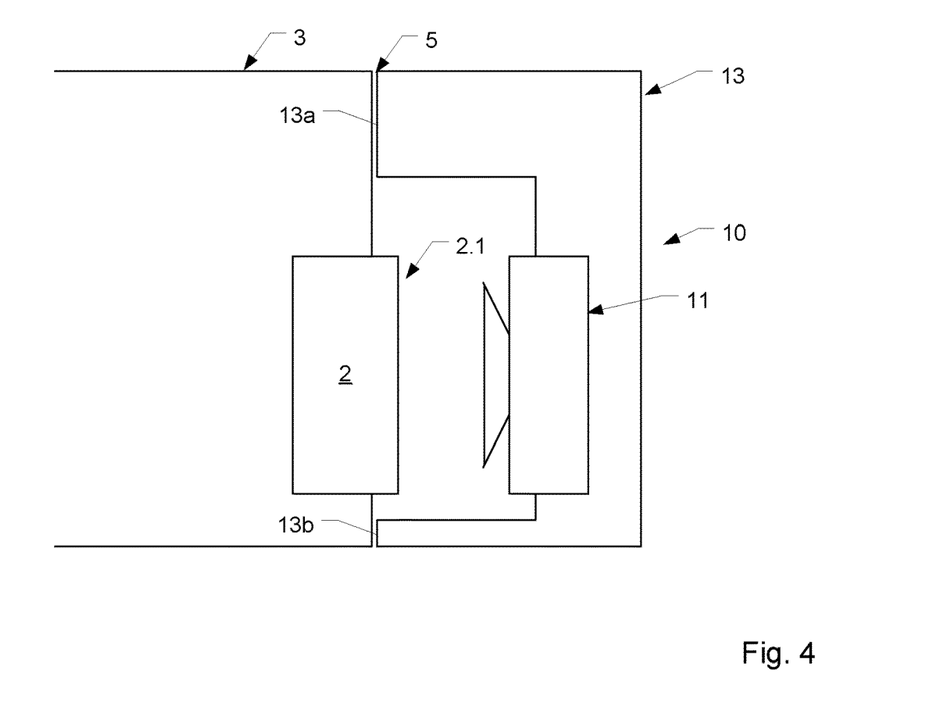
FIG. 4 shows a module-type measurement arrangement for arrangement at a receiving element of the printing station in accordance with a second embodiment.

A measuring device 10 for making measurements pertinent to a position-modifiable component inside the printing station includes a receiving holder 13 that corresponds to the housing or the carrier of the container-holding device 4 and that can be detachably secured to the printing station 3 in a manner analogous to a container-holding device 4.

In some embodiments, the receiving holder 13 includes an upper contact surface 13a and a lower contact surface 13b that interact with corresponding reference surfaces at the printing station 3 in order to detachably secure the measuring device 10 to the printing station 13. Additionally, the receiving holder 13 includes a receiving device 11 that detects the position-modifiable component. Preferably, at least one of the contact surfaces 13a, 13b is shaped to form a radial surface and an axial reference. These make possible the clear and unambiguous determination of radial and axial position when those surfaces interact with corresponding surfaces of the printing station 3 or of the printing module. Examples of such surfaces include an axial reference surface, a shoulder or a lying contact edge, and, as a radial reference surface, a convex surface contour of the receiving holder 13 that can be brought into contact on a positive-fit concave counter-contour of the printing station 3.

Figure 5:
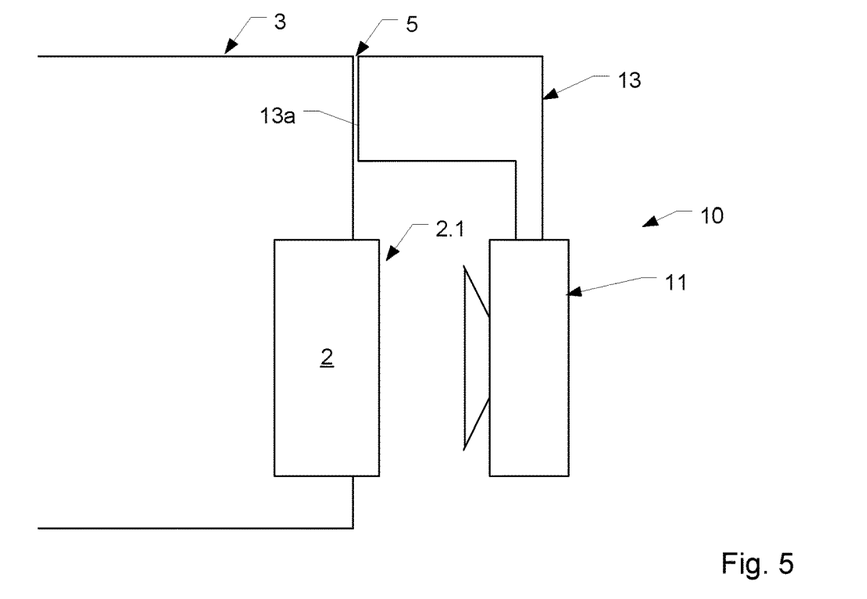
FIG. 5 shows a module-type measurement arrangement for arrangement at a receiving element of the printing station in accordance with a third embodiment.
Figure 6:
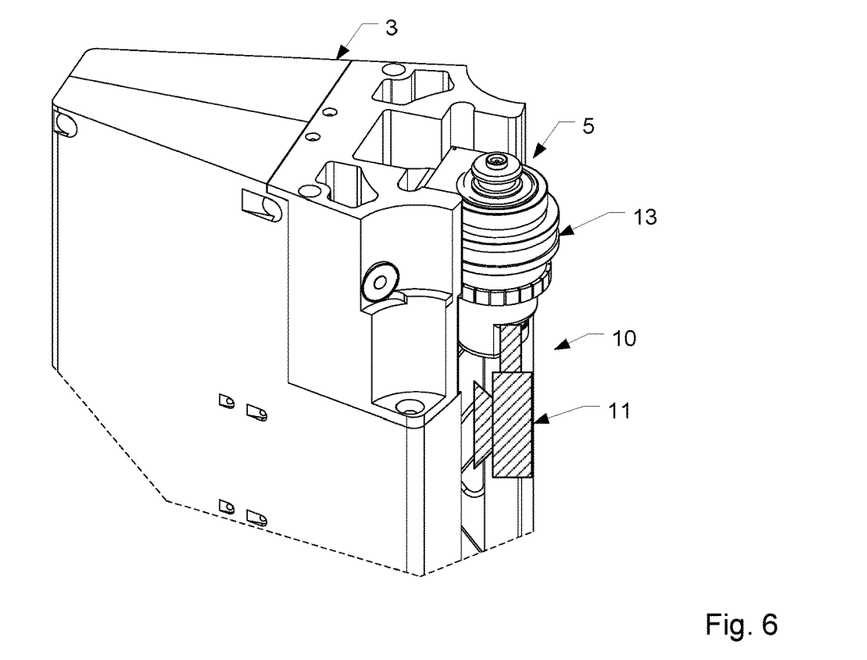
FIG. 6 shows a module-type measurement arrangement for arrangement at a receiving element of the printing station in accordance with a fourth embodiment.

FIG. 5 and FIG. 6 show further exemplary embodiments of a measuring device 10 having receiving devices 11 that the receiving holder 13 suspends upstream of the position-modifiable component that is to be received. In the illustrated embodiment, the receiving holder 13 is analogous to a container-holding device 4 that suspends a container during printing thereof. Such embodiments include a receiving element 5 in the upper region of the printing station 3 into which the receiving holder 13 can be introduced for the detachable fixing. Among these embodiments are those in which the receiving holder 13 is a disk or puck, as shown in FIG. 6. Also among these embodiments are those in which the receiving element 5 is height-adjustable. This permits the receiving device 11 to be positioned at a desired height upstream of the position-modifiable component.

Although it is possible for it to occur elsewhere, it is preferable that fixing the receiving holder 13 to the printing station 3 take place only above the print head 2. For this purpose, the receiving element 5 and the contact surface 13a are shaped in a manner analogous to that shown in FIG. 4. In particular, the receiving holder 13 has a radial reference surface and an axial reference surface with a shoulder or a lying contact edge as the axial reference surface and a corresponding surface contour with a suitable counter-contour of the printing station 3 as the radial reference surface.

Embodiments of the measuring device as described herein offer the advantage of having the receiving device 11 be held by the receiving holder 13 in a manner analogous to a container or analogous to a container-holding device 4 opposite the position-modifiable component, in particular the print head 2, such that, due to the receiving device 11, manufacturing tolerances that are present in the region of the receiving element for the container or for the container-holding device 4 can be taken into account with the receipt of measurement information. This means that such manufacturing tolerances can be taken into account during calibration of the position-modifiable component.

Figure 7:
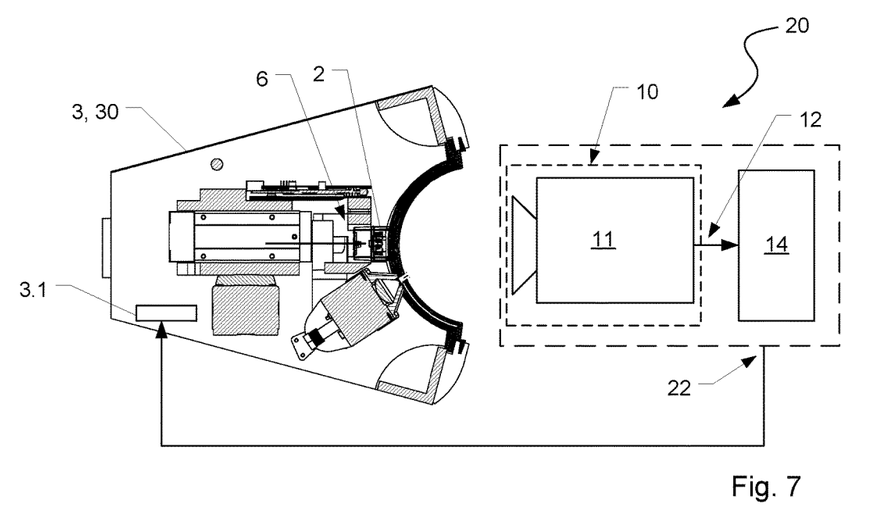
FIG. 7 shows an arrangement of a measuring system upstream of a printing station from above.

FIG. 7 shows a measuring system 20 for calibrating a print head 2 of a printing station 3 that is configured as a printing module 30 similar to that shown in FIG. 2. The measuring system 20 can also be used for measuring and calibrating a non-modular printing station 3 that includes plural individual components arranged at the rotor 6, as shown in FIG. 1.

The measuring system 20 comprises a measuring device 10 that includes a receiving device 11, a computer 14, and a transmission interface 22.

The receiving device 11 optically measures location and/or orientation of a position-modifiable component of the printing station 3. This position-modifiable component can be the print head 2 or a print-head carrier 6 that holds the print head 2. It can be formed by a camera, such as a 3D camera. It can also be formed by a laser scanner, such as a 3D laser scanner.

The receiving device 11 receives multidimensional location information related to the position-modifiable component. This includes two-dimensional or three-dimensional information. In some embodiments, a 3D laser-scanner supplies three-dimensional point clouds. From these, one can derive a complete multidimensional image of the position-modifiable component or at least a section of the position-modifiable component. This serves as a measuring point. On the basis of the point cloud, it is possible, to determine geometrical values, such as lengths and angles. In those cases in which the receiving device 11 includes a 3D camera, it is possible to carry out geometric measurements of the printing station 3.

Some embodiments include receiving measurement information while the position-modifiable component is moving in different spatial directions. Other embodiments receive measurement information while the position-modifiable component pivots about a pivot axis. This is useful when printing upon an oblique surface, such as a container's shoulder.

In some embodiments, the position-changeable component moves and/or pivots over its entire adjustment range. During this movement, the receiving device 11 receives measurement information. In other embodiments, the position-changeable component moves or pivots only over parts of the adjustment range. In yet other embodiments, the position-changeable component moves between individual points in its adjustment range. In such cases, the receiving device 11 obtains measurement information at those individual points.

The receiving device 11 transfers its received measurement information to the computer 21 via a link 12. The link 12 is either a wireless link or a wired link.

After having received the measurement information from the receiving device 11, the computer 14 uses it to determine actual-position data for the position-modifiable component. This actual-position data indicates the position of the position-modifiable component in space at different times.

Other embodiments store reference-position data that indicates the target positions of the position-modifiable component after calibration. The reference-position data indicates where the position-modifiable component should be located when it is correctly calibrated.

The reference-position data contains position values in three-dimensional space at which the position-modifiable component should be located when adjusted along the multidimensional adjustment path. A suitable representation for the reference-position data relies on Cartesian coordinates in the movement space. This reference-position data is stored in storage associated with the measuring system 20.

By comparing actual-position data with reference-position data, it becomes possible to acquire calibration information that can then be used to calibrate the print head 2.

In some embodiments, the computer 14 determines deviations between the actual-position data and the reference-position data. Based on those deviations, it derives calibration information. The calibration information is then used as a basis for adjusting the print head 2 into a calibrated state.

In some embodiments, the computer 14 carries out an optimization routine to determine the calibration information. To so do, the computer 14 relies on position values in the actual-position data and on position values in the reference-position data. In some embodiments, the calibration information indicates by what amount and in what direction the position-modifiable component must be moved or pivoted to attain calibration. The measuring system 20 then outputs the calibration information at the transmission interface 22.

The calibration of the print head 2 based on the calibration information can be carried out in different ways.

A first way to carry out calibration is to directly transfer the calibration information to the printing station 3 that contains the print head 2 that is to be calibrated. In response, the printing station 3 calibrates the print head 2. To do so, the printing station 3 actuates motorized drives that move the print head into the calibration position.

Another way to carry out calibration is to store the calibration information in storage. The storage can be local storage 3.1, as shown in FIG. 3, or common storage 23, as shown in FIG. 8.

In the embodiment of FIG. 3, the printing station 3 has a local memory 3.1 in which the calibration information can be stored. This is particularly advantageous when the printing station 3 is an exchangeable printing module 30. Because the calibration information is already in the local memory 3.1, the calibration procedure is self-contained. There is no need to consult any other information source.

For example, as part of maintenance and repair, a printing module 30 may be sent to a location remote from the rotor 7 on which it is mounted. The printing module 30, complete with calibration information already stored locally in the local memory 3.1, can then be shipped back for installation on the rotor 7. Then, when the printing module 30 is actually mounted on the rotor 7, it will be possible to carry out calibration because the printing module 30 already has its calibration information with it in its local memory 3.1.

Figure 8:
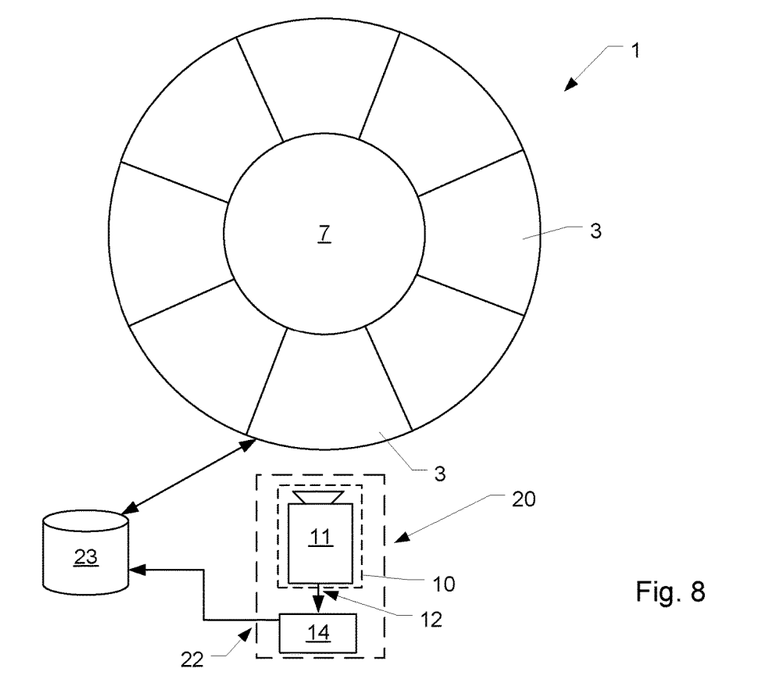
FIG. 8 shows a measuring system connected to a common storage unit.

FIG. 8 shows an alternative embodiment having common storage 23 allocated to the printing device 1. The common storage 23 communicates with all the printing stations 3 of the printing device 1. As a result, calibration information for any printing station 3 can be retrieved from the same common storage 23.

If required, for example when the printing device 1 is taken into operation, or also at an intermediate calibration, the calibration information can be read out and transferred to the relevant printing stations 3. The print heads 2 at those printing stations can then be calibrated using that calibration information.

In an alternative embodiment, the common storage 23 is provided in the measuring system 20 or allocated to the measuring system 20.

A preferred embodiment features a two-step measurement or calibration procedure. This results in greater precision during calibration.

A first step includes measuring the position of the print-head carrier 4. This is the structure that holds the print head 2 as it changes its position within the printing station 3, and in particular, as it moves over part of its adjustment range or its entire adjustment range. A preferred embodiment carries out this first step with the print head 2 dismantled.

This first step results in storing a first set of measurement information at either the common storage 23 or at the local storage 3.1. This stored first-set includes information indicative of the actual position of the print-head carrier 4 at different adjustment positions.

After the first measurement-step, the print head 2 is installed on the print-head carrier 4. Then comes a second measurement-step. The second measurement-step includes measuring the print-head's position as it moves over part of its adjustment range or over its entire adjustment range. Since the print head 2 is an extended object, it is preferable to pick a reference point on the print head 2 and to use the position of that reference point as a basis for the print-head's position. A suitable reference point is point on the print-head's surface or a print-head's nozzle 2.1.

This second step results in second set of measurement-information. The calibration information is then calculated based on the both the first set and the second set.

The invention has been described heretofore by way of exemplary embodiments. It is understood that a large number of modifications or derivations are possible without thereby departing from the inventive concept underlying the invention.

The invention claimed is:

1. An apparatus comprising a measuring device for use in calibrating a print head that prints upon containers in a rotary printing machine, said measuring device comprising a receiving device, a link, and a receiving holder, wherein said receiving device detects measurement information indicative of a value, wherein said value is selected from the group consisting of a position of a position-modifiable component of a printing station having a print head whose position is adjustable by a motor and an orientation of a position-modifiable component of a printing station having a print head whose orientation is adjustable by a motor, wherein said link is configured for transferring said measurement information from said receiving device, wherein said receiving holder is configured to introduce said receiving device into a structure that holds said receiving device at a defined position relative to said position-modifiable component, and wherein said structure is selected from the group consisting of a container-holding device and a receiving element for a container-holding device.

2. The apparatus of claim 1, wherein said receiving holder is configured to be attached to said structure and detached from said structure after having been attached to said structure.

3. The apparatus of claim 1, wherein said structure comprises said container-holding device, wherein said apparatus further comprises an upper fixing-device and a lower fixing-device, wherein said receiving holder is configured for holding said container-holding device between said upper and lower fixing-devices, and wherein said container-holding device is under tension as a result of being held between said upper and lower fixing-devices.

4. The apparatus of claim 1, wherein said container-holding device comprises a mounting surface and a tulip, wherein said receiving holder comprises an upper free-end and a lower free-end, wherein said upper free-end is matched to said tulip, and wherein said lower free-end matches said mounting surface.

5. The apparatus of claim 1, wherein said receiving holder is configured to suspend said receiving device.

6. The apparatus of claim 1, wherein said receiving holder comprises a reference surface that interacts with a counter-surface on said printing station, said counter-surface and said reference surface being complementary to each other.

7. The apparatus of claim 1, wherein said receiving holder comprises a reference surface, wherein said receiving element comprises a counter-surface that is complementary to said reference surface, wherein said reference surface interacts with said counter-surface.

8. The apparatus of claim 1, wherein said receiving device comprises a camera.

9. The apparatus of claim 1, further comprising a laser scanner, said laser scanner being a constituent of said receiving device.

10. The apparatus of claim 1, wherein said receiving device is configured for receiving said measurement information during movement of said position-modifiable component.

11. The apparatus of claim 1, wherein said position-modifiable component comprises a region of a print head.

12. The apparatus of claim 1, wherein said position-modifiable component comprises a print head-carrier.

13. The apparatus of claim 1, wherein said position-modifiable component comprises a printing-head nozzle.

14. The apparatus of claim 1, wherein said position-modifiable component comprises a reference surface of said printing head.

15. The apparatus of claim 1, further comprising a computer that is configured for receiving said measuring information from said receiving device and for determining calibration information based on said measuring information.

16. The apparatus of claim 1, further comprising a transfer interface for transmitting calibration information that is determined by a computer based on said measuring information provided to said computer by said receiving device.

17. The apparatus of claim 1, further comprising local storage at said printing station, said local storage being connected to a transfer interface that provides, to said local storage, calibration information that has been determined based on said measuring information.

18. The apparatus of claim 1, further comprising central storage, said central storage being connected to a plurality of transfer interfaces, each of which provides, to said central storage, calibration information that has been determined based on measuring information associated with one of a corresponding plurality of printing stations.

19. The apparatus of claim 1, further comprising a transfer interface, an actuator, and a control unit for controlling said actuator, said actuator being a constituent of said printing station, wherein said transfer interface is configured to provide calibration information directly to said control unit for causing said actuator to effect movement of said print head.

20. A method comprising calibrating a print head of a printing station, said method comprising introducing a measuring device into a container-holding device, using said measuring device, acquiring information, and calibrating said print head based on said information, wherein said information is indicative of a value, wherein said value is selected from the group consisting of a position of a position-modifiable component of said printing station having a print head, said position being adjustable by a motor and an orientation of a position-modifiable component of a printing station, said orientation being adjustable by a motor, wherein introducing a measuring device into a container-holding device comprises an act selected from the group consisting of a first act and a second act, wherein said first act comprises introducing said measuring device into a container-holding device that is provided at said printing station, and wherein said second act comprises bringing said measuring device to a receiving element provided at said printing station, said receiving element being configured to receive on behalf of a container-holding device.

* * * * *